July 7, 1964 J. W. HENRY ETAL 3,140,095

RECORD AND PACKAGE THEREFOR

Filed Nov. 10, 1961

JAMES W. HENRY
WILLIAM D. KENNEDY
INVENTORS

BY R. Frank Smith
Harold N. Powell
ATTORNEYS

United States Patent Office 3,140,095
Patented July 7, 1964

3,140,095
RECORD AND PACKAGE THEREFOR

James W. Henry and William D. Kennedy, both of Kingsport, Tenn., assignors to Eastman Kodak Company, Rochester, N.Y., a corporation of New Jersey Filed Nov. 10, 1961, Ser. No. 151,559
8 Claims. (Cl. 274—42)

This invention concerns a novel type record and if desired the use thereof in the form of a novel package. More particularly this invention concerns a special laminate record involving certain plastic combinations in its make-up.

As is known, conventional phonograph records are pressed by means of a compression molding process from compounds of poly(vinyl chloride) or polystyrene. In the case of the polystyrene resin they are also injection molded. In an effort to reduce the cost of records some manufacturers have turned to laminating films of poly(vinyl chloride) or cellulose acetate to a paper support so that the plastic surface acts as a wearing and detail retaining surface to carry the phonographic etching which is impressed upon the surface by means of a metal negative replica of the original recording. This metal replica is called by the trade a "stamper." Records which have heretofore been prepared by laminating cellulose acetate or poly(vinyl chloride) to a paper base are generally characterized by poor surface wearing properties and high noise level which appears to be caused by the inability of the laminated surface to conform exactly to the groove structure of the stamper.

In view of the current interest in reasonably good quality reproducing in records, it is believed apparent that the development of a record which will have low noise level and otherwise provides more faithful reproduction but still is of relatively low cost represents a highly desirable result. After extended investigation and tests, we have discovered such a record which may not only be used in conventional ways but which lends itself to a variety of new manners of use which will be apparent from the description which follows.

This invention has for one object to provide a novel laminated type record wherein provision is made for the sound groove carrying surface to more readily assume the groove configuration supplied by the stamper or similiar forming member. Another object is to provide a record of the type aforesaid wherein by a special combination of plastic components, wearability is secured in combination with low noise level and other benefits. Still another object is to provide a record made of a special combination of support, intermediate polyolefin plastic and polyester surface plastic. Still a further object is to provide a record which may be used in a number of ways apart from conventional use, such as positioned on a record package in combination with a conventional high-fidelity record contained therein. Other objects will appear hereinafter.

In the broader aspects of working out our invention, we have made experiments relating to the wear properties of polymeric materials when applied to phonograph records constructions which have led us to the conviction that a satisfactory record can be prepared using a thin skin of polymeric material having excellent wear properties and a softer underlying material which allows the total plastic laminated structure to assume the groove structure which is applied to it by the stamper or similar forming device.

We, therefore, contemplate a structure consisting of a wear resistant material having an exceeedingly thin cross section (in the order of one half thousandth of an inch thickness) combined with a thicker soft material which also acts as an adhesive to bind the sandwich together and also as a soft material which would take the form of the groove structure. The physical properties of the harder, wear resistant material were selected to be such that the thin film of material would deform suitably to reproduce the groove structure with the softer underlying material flowing to thinner or thicker dimension as required to reproduce the groove structure impressed in it by the record stamper. A paper base or the like would be used to a substantial extent as a means of increasing the thickness of the complete record so that it may be more easily handled by the person playing the disc.

We have found that records made according to the principles just set forth play with a quality of sound output which may be classed as "high fidelity." The hard wearing surfaces of the thin skin of material which is overlaid over the softer core also contribute to the sound quality of the record. Inasmuch as the thin skin may easily comply to the groove structure, due to its thinness, the groove structure which is present on the record stamper is more perfectly reproduced than would be the case if the laminated layer were a thick section of the hard wearing material.

Cost of the product is markedly reduced while retaining the performance of a more expensive molded product. The thin wearing surface is low in per unit cost because the quantity required per unit is small. The softer material which is used as a core and conforming material is less costly and thus may be made thicker without prohibitive cost. The properties of the yielding core material may be adjusted for more perfect performance without any restraints being imposed on the application due to poor wearing properties of the material. The support or base material, is of paper, which may be purchased at low cost and may serve a dual purpose. The paper support may be used as a container material as well as a support for the groove carrying laminate as will be described in detail hereinafter.

For a more complete understanding of our invention, reference is made to the attached drawings forming a part of this application.

Figure 1:
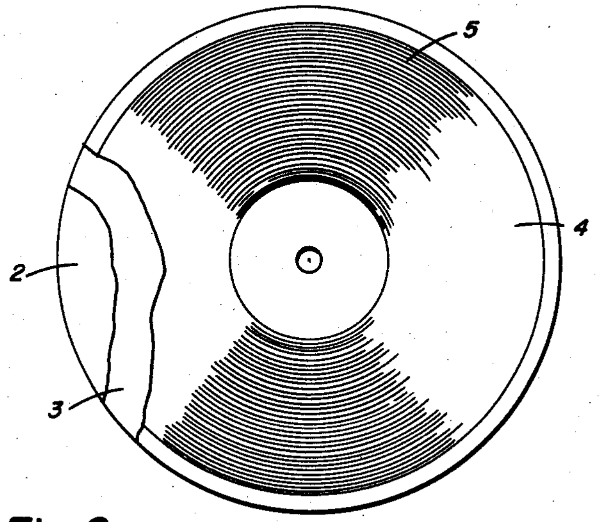
FIGURE 1 is a top view, with portions borken away, showing the laminated construction.

Referring to FIGURE 1, 2 represents a suitable base material as cardboard or other heavy paper. At 3 is shown the softer core material, such as polyolefin plastic. Positioned thereover is the wearing plastic surface 4 the chemical composition of which will be explained in greater detail hereinafter and which surface carries the sound grooves 5.

Figure 2:
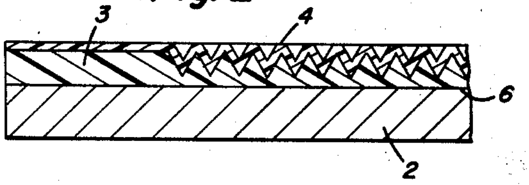
FIGURE 2 is a sectional view at some random point in the record, said view being on an enlarged scale, further illustrating the laminated construction.

Referring to FIGURE 2, this cross-sectional view illustrates diagrammatically that the wear layer 4 is relatively thin as within the range of 0.2 to 3.0 thousandth of an inch. The softer intermediate layer 3 will be thicker as will be apparent from the examples which follow and would be within the range of 1.0 to 10.0. Likewise, the support or base material 2 may be thicker and the particular thickness is not particularly critical as are the foregoing. Such base material bonds to the plastic layer as at the interface 6.

Figure 3:
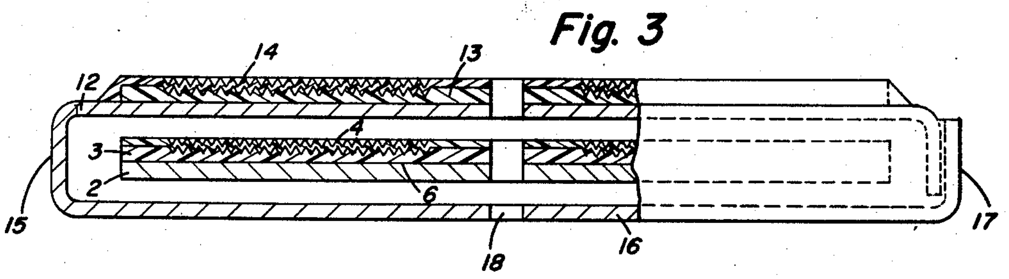
FIGURE 3 is a semi-diagrammatic side elevation view of a novel record package embodying the present invention in an illustrative new and different type use thereof.

Referring to FIGURE 3, 12 corresponds to the cardboard base of FIGURES 1 and 2 above. The softer layer of plastic is represented by 13 and the wearing surface containing sound grooves has the numeral 14. However, from this FIGURE 3 it will be noted that the cardboard base 12 is extended by portions 15, 16 and forms a usual cardboard record package. Any suitable access closure may be provided as at 17. Such package is further provided with spindle openings or punch-outs for such openings, going through the package as at 18. The purpose of such spindle openings as well as the purpose for the new package combination diagrammatically illustrated in FIGURE 3 will be further apparent from the description which follows.

The preferred materials for forming the outer skin of the phonograph record prepared according to this invention are the polyesters and copolyesters prepared from 1,4-cyclohexanedimethanol and described in more detail in U.S. Patent 2,901,466. Particularly useful is the copolyester obtained by reacting 0.83 mole of dimethyl terephthalate, 0.17 mole of dimethyl isophthalate and at least 1.0 mole of 1,4-cyclohexanedimethanol. The unmodified poly(1,4-cyclohexylenedimethylene terephthalate) is also useful in this invention. Other modified poly(1,4-cyclohexylenedimethylene terephthalates) are also useful where the modifying diacid amounts to less than about 50 mole percent of the total diacid. Such diacids as phthalic, isophthalic, suberic, succinic, pimelic, or suberic acid or their esters may be used.

Poly(ethylene terephthalates) may also be used for the outer skin in the application of this invention. Other polyesters such as those obtained from 4,4-sulfonyldibenzoic acid or its esters and glycols such as 1,5-pentanediol, 1,6-hexanediol, and the like may be used in the practice of this invention. Polyesters obtained from 2,6- or 1,5-napthalene dicarboxylic acid and ethylene glycol, and the like are also utilizable. Poly(amide-esters) are also adaptable. Combinations of poly(1,4-cyclohexylenedimethylene terephthalate) with 1,4-cyclohexanedimethanol and 4-(aminomethyl)cyclohexanemethanol where the latter ranges from 0–50 mole percent of the total combined acids are utilizable.

Polyamides such as 6,6 nylon, 6,10 nylon, and 6 nylon are utilizable. Polyamides from pimelic and suberic acids with 1,4-cyclohexanebis(methylamine) also can be used. Polycarbonates such as are prepared from Bisphenol A prove utilizable as a wearing surface for records constructed according to the principles of this invention.

Homopolymers of ethylene, propylene, and other olefins, when suitably processed, may be used as the wearing surface for records constructed according to this invention. Copolymers of the olefins may also be used in this application. By suitable treatment, poly(vinyl chloride) resins may be used as the wearing surface for such records. Other polymers, such as poly(methyl methacrylate), may be used when the films formed of such materials are treated to provide the required physical properties so that the thin skin so formed is such that it will conform to the groove structure impressed in the record laminating material.

In addition to films which may be formed by the condensation polymers, films which are formed by addition polymerization may be employed to some extent. Copolymers of methyl acrylate and acrylonitrile as well as homopolymers of the acrylates such as butyl and ethyl acrylate are illustrative of these products which may be used. However, as indicated above for best results we prefer to employ the polyester film first referred to.

Therefore in summary the choice of material to be used for the thin wearing surface of the record is dictated by abrasion resistance of the material and its ability to conform to the groove structure which is impressed into the sub or conforming layer of soft material by the metal stamper.

The soft sub or conforming layer which is used in the sandwhich which forms the record groove bearing material for records constructed according to this invention may be of material which is easily formed by heat and pressure or other mechanical means to the shape of the groove structure borne on the metal stamping plate. Our preferred material is polyethylene, though homopolymers of propylene or other olefins may be employed in this application. Copolymers of butene and propylene also offer materials suitable for this use. Plasticized poly (vinyl chloride) resins may be used in this application and specially treated polymers such as polystyrene or poly (methyl methacrylate) may be used.

A further understanding of our invention will be had from a consideration of the further description and particularly the examples which follow for illustrating certain of our preferred embodiments.

*Example I*

In this example we have used a construction in which a paper base having a thickness of twenty thousandths of an inch is laminated to a polyester film as first mentioned above having a thickness of one half thousandth of an inch. This polyester film is used as the wearing surface. A core consisting of one thousandth inch thickness of polyethylene film is used to bind the paper and polyester film together as well as to provide a soft and easily flowed material to conform to the groove structure of the record stamper. Successful pressing of this material was accomplished at pressures ranging from 750 pounds per square inch to 2200 pounds per square inch which happened to be the limit of the press. Temperatures at which the flow of the core material was sufficient to provide excellent conformity to the groove forming stamper ranged from 100 degrees centigrade to 150 degrees centigrade.

When discs which had been prepared in this manner were played using a standard commercial phonograph with sapphire stylus, the sound quality which resulted from the playing was judged commercially satisfactory by a panel of impartial listeners. By commercially satisfactory, is meant that the sound was crisp and yet fully rounded as far as frequency range is concerned. Several of the listeners commented that the quality of sound from this type of record was equal to and perhaps better than that of certain polystyrene discs which have been injection molded.

This example illustrates the principle of the present invention as follows: To produce a long wearing record having high-fidelity sound a thin skin of hard wearing material which provides the surface upon which the stylus rides is provided. Under this thin skin we provide a softer and more conforming layer of plastic material which supports the thin skin and deforms in the molding or stamping process to conform to the groove structure to be placed on the record. By making the hard wearing surface thin, we are able to cause it to deform sufficiently so that it flows smoothly over the underlying conforming layer without wrinkling. We have found that the material which forms the outer wearing skin should be one which is capable of being formed over the conforming layer. If this layer is not capable of flowing over the under conforming layer and breaks due to this deformation, the record will be noisy and unsatisfactory.

While in this illustrative example the base or support material was of paper, we can make configurations in which the base is metal, plastic, glass, or wood, or composition boards. The purpose of the base is primarily that of a support and does not enter into the sound producing portions of the record of this invention.

We have made life tests of records which have been prepared according to the principles set forth here and these tests show that the life of such a record using a polyester wearing film as the outer surface [a material such as poly(1,4-cyclohexylenedimethylene terephthalate)] can be played in excess of 2000 playings without visible or audible effect upon the performance of the record.

*Example II*

In accordance with this example the laminate construction was generally the same as in Example I. However, on the paper base the soft layer was comprised of polyethylene and the wearing layer was comprised of polyethylene terephthalate. The sound grooves were stamped into the record as described under the preceding example. Although the record of this example compared satisfactorily to prior art records of somewhat higher cost, the record of this example was not as good as the preferred combination of the preceding example.

*Example III*

In accordance with this example our laminated record was made of the following combinations:

(1) 19 point milk carton board (coated on both sides by extrusion of polyethylene), 0.001" poly(1,4-cyclohexylenedimethylene terephthalate) (extrustion coated on one side with one thousandth of an inch of low molecular weight polyethylene).

(2) 20 point chip board, four thousandths of an inch of polyethylene sheeting, one thousandth of an inch of poly(1,4-cyclohexylenedimethylene terephthalate) extrusion coated with 0.001" of low molecular weight polyethylene.

(3) 18 point chrom-coat box board, extrusion coated with polyethylene wax (Eastman Epolene C) thickness 4 mils., 0.001" poly(1,4-cyclohexylenedimethylene terephthalate) coated with 0.001" low molecular weight polyethylene.

(4) 19 point milk carton board, extrusion coated both sides with polyethylene, 0.0005 inch of poly(1,4-cyclohexylenedimethylene terephthalate) coated with 0.001" of low molecular weight polyethylene.

(5) 19 point milk carton board, extrusion coated both sides with polyethylene, 0.0005 inch polyethylene terephthalate coated with 0.001" low molecular weight polyethylene.

The sound grooves were pressed into the surface by the following steps:

(1) The sandwich was assembled for combination (1) and placed in a hydraulic press under 500 p.s.i. pressure. Heat was applied to the sandwich under this pressure by means of steam heated platens. The platens were preheated to 100° C. prior to insertion of the assembled sandwich in the press. The pressure was raised to 2100 p.s.i. and held until cooling water circulating through the platens of the press had cooled the sandwich to room temperature. Subsequent experiments were carried out at temperatures of 110° C., 120° C., 130° C., 140° C., 150° C., and 160° C. This last temperature was the limit which was available from the steam heating system of the press which was used. Subsequent experiments were carried out at each of the above stated tecperatures and the pressure placed on the sandwich during the cooling cycle was modified. Experiments were carried out at each of the following temperatures and pressures.

100° C., 750, 1000, 1250, 1500, 2000, 2100 p.s.i.
120° C., 750, 1000, 1250, 1500, 2000, 2100 p.s.i.
130° C., 750, 1000, 1250, 1500, 2000, 2100 p.s.i.
140° C., 750, 1000, 1250, 1500, 2000, 2100 p.s.i.
150° C., 750, 1000, 1250, 1500, 2000, 2100 p.s.i.
160° C., 750, 1000, 1250, 1500, 2000, 2100 p.s.i.

All of the combinations of materials cited were tested under these conditions. Tests of these records indicated the following:

Records pressed at 100° C. and 750 p.s.i. were not satisfactory in the outermost grooves because of imperfect forming of the materials. The quality of the sound pressed into the materials under these conditions was not perfect, lacking in delicate detail. As the pressures of pressing were raised, the quality of the sound record was improved.

Records pressed at 160° C. and 2100 p.s.i. pressure were perfect in reproduction of the stamper but suffered occasional rupture of the paper supporting base. Records pressed at 120° C. and 2100 p.s.i. were satisfactory in quality. In general pressure may be exchanged for temperature above 120° C. to provide the quality of impression which is desired.

Records pressed at high temperature and high pressure tend to produce more perfect replicas of the stamper details. As pressure is lowered conformation of the sandwich material to the stamper is lowered. In creasing temperature improves the conformation of the sandwich material to the stamper. Sound quality of the records produced by the above described techniques is a function of the pressure and temperature at which the sandwich is pressed. Higher fidelity is achieved at high (2100 p.s.i.) pressures and temperatures above 120° C. Within the rupture limits of the paper base raising the temperature of the sandwich during the pressing operation increases the quality of the record. In general, excellent sound quality may be attained at temperatures 120° C. and above, and pressures in excess of 1500 p.s.i. At higher temperatures the pressure may be lowered to 750 p.s.i. with retention of the sound quality of the record.

Attention is now turned to ways in which the new type record as described above may be used. Inasmuch as our new record possesses properties, not possessed by conventional plastic records, a number of new fields of utilization are now open.

The small retailer who vends phonograph records generally is unable to maintain a stock of records sufficient to allow the maintenance of a sample record collection for demonstration purposes. For this reason it is customary for the prospective purchaser of a record to ask and receive, permission from the record shop owner to play a record in which the prospective purchaser is interested.

While such a system may be in the best interest of retail merchandizing, it is frowned upon by the "high fidelity" enthusiast. The demonstration machines which are generally available in retail music shops for the playing of demonstration records may be of poor mechanical quality. The inherent ability of such machines to damage the delicate surfaces of a well recorded, wide acoustic range record is well known, and when this ability is compounded with the poor state of repair which may be found in these machines, the possibilities for destruction of some of the musical qualities of the demonstration record are apparent.

Therefore, since the small record dealer does not maintain an extensive stock, in many cases the record which is demonstrated is the only copy which he has available for sale. The purchaser of the record often finds that he has purchased a record in apparently new condition only to find that the record is in fact a used item of poorer quality than would be the case if the purchaser had possessed and used the record carefully for years.

Such a retail transaction does not endear the retail dealer to the customer. Yet the retail dealer is expected by his customers to demonstrate his records; even records which have such a low sales potential that he is economically justified in keeping only one copy of the record for stock. The same customer who complains about the poor quality of a disc which he has purchased will insist upon playing a disc which he contemplates buying in the retailers store.

Our invention makes unnecessary the maintenance of a duplicate copy of a record for demonstration purposes by the retail dealer. The customer will still be able to demonstrate the acoustic content of the record without playing the copy which will ultimately be delivered to the purchaser. Thus both the needs of the retail dealer and the purchaser will be met.

As may be noted from FIGURE 3 we have provided a novel package for the merchandising of phonograph records. The package is constructed of paper board in the way which such packages have been constructed for these purposes. The package may be imprinted with such graphic art as is deemed necessary by the manufacturer to promote his product successfully. In addition to the graphic arts display on the surface of the package there will be laminated a thin film or films of thermoplastic materials as described above. Embossed in these films will be a copy of the phonograph record which is contained within the package. This copy will be fitted to the surface of the package and so positioned that the package may be placed upon a suitable rotating table, or platform, and the sound which is embossed upon the surface reproduced in the same manner as the sound molded into the surface of the record disc contained in the package would be reproduced.

Such a record package might be promoted as a sampler package. The sound embossed upon the surface does not necessarily need to be entirely the same sound program which is carried by the record contained within the package. In addition, program material illustrative of other records which the manufacturer has to sell may be included. Program notes, recorded by narration, may be carried on the package surface.

As indicated above the record package generally takes the form of a sleeve or pocket, in which the record disc may be slipped and sealed, thus providing a dust tight protective packaging for the record. The physical shape of the plane sides of this protective sleeve may be altered to serve the needs of the art designer of the package. In general, two shapes offer great utility from a fabrication and ultimate use standpoint.

In one configuration of our invention, the shape of the planes which form the sides of the package is square. The record embossing upon the surface is placed so that the center of the embossed groove pattern is coincident with the intersection of the crossed diagonals of the planes which form the package. At the center of this embossed record a hole of suitable dimensions for positioning the package on the turntable is perforated. This hole may have the same dimensions as the hole which is placed in the center of the record contained within the package or it may have a smaller diameter so that a spindle may be passed through the packaged record without touching the sides of the hole in this record.

In another configuration of our invention, the center of the record is located over the center of the demonstration turntable by a square frame which is fixed to the demonstration turntable. The sides of this frame are arranged so that the square package may be dropped into the receptacle which is formed by the frame. The positioning of the frame on the turntable is such that the center of the embossed sample record carried on the surface of the package is over the center of rotation of the turntable. A suitably long reproducing arm is used to clear the corners of the rotating package and the turntable frame.

In a third configuration of our invention, the shape of the package plane sides is circular. The center of the embossed sample record is adjusted to coincide with the center of the circular package. Again the option of a center hole of equal or smaller diameter than the hole of the record contained within the package is envisioned. Should no center hole be desired in the package, the option of a frame on the edges of the turntable is proposed. The frame for use with circular packages would be circular and so adjusted that the center of the package and embossed sample record would coincide with the center of rotation of the turntable.

The shapes of the planes which form the two large sides of the package are not necessarily limited to the shapes which we have described. Other shapes are possible, such as rectangular, hexagonal, octagonal, triangular, eliptical, etc. Suitable hole perforation for the center location, or turntable frames would be available for playing these records.

The embossed surfaces of the record on the outside of record package are formed by pressing metal stamping plates into the hot surfaces of a thermoplastic film which has been laminated to the surface of the paper package as already fully described above.

The advantages of our invention over the conventional methods of packaging phonograph records are many. Our preferred tough plastic film laminate in addition to offering a surface suitable for embossing a record sample of the contents of the record package also provides a tough skin which enhances the wearing properties of the record package. Since the plastics which are preferred for this application are transparent, it is possible to underprint the laminate so that a graphic arts display may be offered on the record package. The acoustic record which is embossed on the surface provides a sound message to illustrate the contents of the package, advertise other wares which the manufacturer may wish to sell, and as a narration of program notes which may be desired to accompany the music.

In the above description when we refer to a soft plastic (core layer) we contemplate a material having hardness values within the range of D34 to D78 on durometer scale. The molecular weight and other properties of our preferred polyethylene and polypropylene are as follows: The plastic or wax should have a molecular weight greater than 3000. The material may be used supplied either in an amorphous or highly crystalline state. Co-polymers of the olefins are also successful in the application.

Rather than use non-oriented, or film oriented lengthwise other films may be used. A biaxially-oriented film of a polyester comprising the polymeric condensation product of terephthalic acid, isophthalic acid and 1,4 cyclohexane-dimethanol in the molar proportions 5:1:6 was made by extrusion of a sheet, continuously stretching the sheet about threefold in the lengthwise direction and about threefold in the transverse direction, and subsequently heat setting the oriented film at a temperature above 200° C. may be used.

While several modifications have been described, there are other modifications which may be made. In the process of making the records rather than proceeding to coat the base with the soft plastic and then overcoat with the thin wearing layer, the following may be a more suitable method under certain circumstances. A preformed composite sheet may be prepared. For example, the thin wear resistant polyester plastic film is coated with the thicker polyolefin layer. Or this may be accomplished by extruding or laminating a polyolefin film onto the polyester thin film. Such composite film of polyester and polyolefin may be rolled up or otherwise stored until used. That is, a piece of this composite film intermediate product is placed over the desired base or support. Then by pressure, limited heat and use of stamper and like as already explained an embossed record may be easily prepared. Such composite sheet is helpful and convenient for small manufacturers who do not have coating equipment. The composite sheet also has other uses.

Although the invention has been described in considerable detail with particular reference to certain preferred embodiments thereof, variations and modifications can be effected within the spirit and scope of the invention as described hereinabove, and as defined in the appended claims.

We claim:

1. As a new article of manufacture, a record package comprising a container having outer surfaces including top and bottom members and adapted to contain therewithin a conventional high-fidelity record having a record player spindle opening in the center of such record, provision in at least one of said outer surfaces and in line with said spindle opening whereby the package may be placed on a record playing spindle and the spindle extended through an outer surface and through the opening in any record contained therewithin, the package being further characterized in that at least one of the outer surfaces carries a thin, wear-resistant plastic thereover bonded to said surface by a layer of bonding material that is softer and more readily deformable as compared with the harder thin, wear-resistant plastic, said wear-resistant plastic carrying imprints of sound grooves from a record-stamper which folds the said wear-resistant plastic into the desired configurations, the said wear-resistant plastic being of a thickness which is controlled by the sound-groove dimension of the impressed recording, said groove dimension controlling the thickness of said layer by virtue of the relation of the dimension to the ability of the thin wear-resistant layer to be folded on a sharp radius, said sound grooves corresponding at least in part to some of the sound grooves on said conventional record contained therewithin, the wearing plastic also serving at least to some extent to enclose and protect the outside of said package whereby the sound grooves on the outer surface of the package may be played to give a facsimile of at least a part of the contents of said conventional record contained within the package without removing the conventional record from the package.

2. As a new article of manufacture, a record package comprising a container having outer surfaces including top and bottom members and adapted to contain therewithin a conventional high-fidelity record having a record player spindle opening in the center of such record, the package further having provision for a hole in at least one of the outer surfaces, in line with the spindle opening of the record contained in the package, whereby the package may be placed on a record playing spindle and the spindle extended through an outer surface and through the opening in any record contained therewith, and the package being characterized in that at least one of the outer surfaces carries a thin, wear-resistant plastic thereover bonded to said surface, said wear-resistant plastic carrying imprints of sound grooves from a record stamper which folds the said wear-resistant plastic into the desired configurations, said wear-resistant plastic being of such thickness as to permit the thin wear-resistant plastic to be folded on a sharp radius, and thus to be caused to conform to the dimensions of the grooves of the stamper.

3. The package of claim 2, wherein the thin wear-resistant plastic is bonded to the outer surface by a layer of bonding material that is softer and more readily deformable than is the thin wear-resistant plastic.

4. The package of claim 2, wherein the sounds recorded in the grooves of the thin wear-resistant layer correspond at least in part to some of the sound grooves of the conventional record contained within the package.

5. The package of claim 2 wherein the thin wear-resistant layer is of a thickness not greater than about three thousandths of an inch.

6. The package of claim 2 wherein the thin wear-resistant layer is a polyester plastic material.

7. The package of claim 2 in which polyolefin comprises the bonding material between the thin wear-resistant layer and the outer surface of the package.

8. The package of claim 2 wherein the thin wear-resistant layer is comprised of a plastic composition from the group specifically consisting of poly(1,4-cyclohexylenedimethylene terephthalate) and copolyesters of 1,4-cyclohexylenedimethylene terephthalate-isophthalate.

References Cited in the file of this patent

UNITED STATES PATENTS

| | | |
|---|---|---|
| 1,997,398 | Whyte | Apr. 9, 1935 |
| 2,225,048 | Hasin | Dec. 17, 1940 |
| 2,351,600 | Collings | June 20, 1944 |
| 3,009,707 | Schulein | Nov. 21, 1961 |